United States Patent [19]

Emerich et al.

[11] Patent Number: 5,300,247

[45] Date of Patent: Apr. 5, 1994

[54] IMPROVED CORROSION INHIBITOR SYSTEM FOR AN INTERMEDIATE HEAT TRANSFER MEDIUM

[75] Inventors: Dwight E. Emerich, Lincoln Park; Kathleen A. Fix, Landing, both of N.J.

[73] Assignee: Ashchem IP, Dublin, Ohio

[21] Appl. No.: 939,056

[22] Filed: Sep. 2, 1992

[51] Int. Cl.$^5$ ............................................. C09K 5/00
[52] U.S. Cl. ..................................... 252/77; 252/73; 252/71; 252/392; 252/394; 252/390; 422/17; 548/239
[58] Field of Search ............... 252/71, 79, 390, 392, 252/394; 422/17; 548/239

[56] References Cited

U.S. PATENT DOCUMENTS 4,402,907  9/1983  Clark ........................................ 422/7

Primary Examiner—Paul Lieberman
Assistant Examiner—Necholus Ogden
Attorney, Agent, or Firm—Louis E. Marn

[57] ABSTRACT

There is disclosed an improved corrosion inhibitor system including an oxazoline for an intermediate heat transfer medium for an indirect cooling heat transfer assembly and introduced in an amount of from 100 to 15,000 ppm to one part of the medium.

12 Claims, No Drawings

_5,300,247_

IMPROVED CORROSION INHIBITOR SYSTEM FOR AN INTERMEDIATE HEAT TRANSFER MEDIUM

BACKGROUND OF THE INVENTION (a) Field of the Invention

This invention relates to an improved corrosion inhibitor system, and more particularly, to an improved corrosion inhibitor system for an intermediate heat transfer medium used in indirect cooling processes.

(b) Description of the Prior Art

In the chemical industry, there are many requirements for cooling heat transfer units wherein heat exchanger assemblies are designed for corrosive products, high pressures, high viscosities and the like unsuited for a refrigeration condenser/evaporator system. Such indirect cooling of heat transfer units are based on the use of an intermediate heat transfer medium, such as salt-based brines, glycol base brines, organic based brines using methylene chloride acetone and the like, in an indirect heat transfer assembly wherein the intermediate heat transfer medium may be cooled in an evaporator of a refrigeration system or with cooling water or other cooling medium and heated in the unit operation or process requiring cooling. Indirect heat transfer cooling systems using brines as the intermediate heat transfer medium include corrosion inhibitor systems to reduce corrosion rates of the heat transfer surfaces.

Corrosion inhibitors for such intermediate heat transfer media have been based upon the use of chromate salts, phosphates, phosphonates, nitrites, acrylates and the maintenance of a high pH. Chromate salts are being eliminated as a result of toxic effects to the environment. All such corrosion inhibitor systems are of limited success, particularly when used in a calcium chloride based intermediate heat transfer medium.

Problems associated with such corrosion inhibitors include, inter alia, sludge formation, promotion of pitting, ineffective protection of metal surface and the like. There is the need for an improved corrosion inhibitor system with minimal formation of sludge and low corrosion rates.

OBJECTS OF THE INVENTION

An object of the present invention is to provide an improved corrosion inhibitor system for a salt-based intermediate heat transfer medium to reduce sludge formation at low corrosion rates.

Another object of the present invention is to provide an improved corrosion inhibitor system for a salt-based intermediate heat transfer medium exhibiting good corrosion inhibition in low conductivity systems.

Yet another object of the present invention is to provide an improved corrosion inhibitor system for a salt-based intermediate heat transfer medium exhibiting significant decrease in corrosion rates of mild steel, copper and copper bearing alloys and aluminum.

Still another object of the present invention is to provide an improved corrosion inhibitor system for a salt-based intermediate heat transfer medium of environmentally-safe components.

A still further object of the present invention is to provide an improved corrosion inhibitor system for an intermediate heat transfer system exhibiting good corrosion inhibition in low conductivity system using copper tubes.

SUMMARY OF THE INVENTION

These and other objects of the present invention are achieved by an improved corrosion inhibitor system including an oxazoline for an intermediate heat transfer medium for an indirect cooling heat transfer assembly and introduced in an amount of from 100 to 15,000 ppm to one part of the medium.

DETAILED DESCRIPTION OF THE INVENTION

It has been found that an oxazoline in small amounts as a component in a corrosion inhibitor system for an intermediate heat transfer medium substantially decreases the corrosion rates of the heat transfer system, particularly those formed of mild steel, copper and copper bearing alloys and aluminum. With calcium chloride-based intermediate heat transfer mediums of from 5000 to 15,000 ppm, preferably of from 7500 to 10,000 ppm of the corrosion inhibitor system of the present invention is introduced to achieve substantial reduction of corrosion rates as more fully hereinafter set forth. For use in indirect cooling heat transfer assemblies utilizing copper tubes associated with induction heating assemblies, the introduction of from 100 to 5000 ppm of the corrosion inhibitor system of the present invention into an intermediate heat transfer medium therefor where conductivity must be maintained below about 50–100 micromhos provides like efficacious anti-corrosion results. The upper level of the oxazolines is a function of the solubility thereof in the corrosion inhibitor system and a desire to minimize sludge formation.

The oxazolines are included in an amount of from 0.01 to 5.0 wt. %, preferably 0.1 to 1.5 wt. % as a member of the components of the corrosion inhibitor system of the present invention to be introduced into the intermediate heat transfer medium. The improved corrosion inhibitor system also includes organic compounds, such as tricarboxylic acid, organophosphates, morpholines and inorganic compounds, such as caustic potash. The oxazolines include 2,2'-[(2-heptadecyl)-4(5H)-oxazolylidine-bis (methyleneoxy-2, 1-ethanediyloxy)]-bis ethanol 2,2'(2-heptadecyl)-4(5H)-oxazolylidine bis methanol and 2,2'-(2-heptadecyl)-4(5H)-oxazolylidine ethane methanol with 2,2'-[(2-heptadecyl)-4(5H)-oxazolylidine-bis (methyleneoxy-2, 1-ethanediyloxy)]-bis being particularly effective.

A preferred corrosion inhibitor system of the present invention includes in addition to oxazolines, a compound selected from the group consisting of an organophosphonic acid and water-soluble salts therefor, a compound selected from the group consisting of an azole and water-soluble salts thereof and a compound selected from the group consisting of a triazine and water-soluble salts thereof. A compound of the organophosphonic acid type is present in an amount of from 1.0 to 20 wt. %, preferably 1.0 to 5.0 wt. % and include hydroxyphosphonoacetic acid, hydroxy-1, 1-diphosphonic acid, aminotri (methylene-phosphonic acid), diethylene-triaminepenta (methylene-phosphonic acid). A compound of the azole type are present in an amount of from 0.1 to 5.0 wt. %, preferably 0.2 to 1.0 wt. % and include mercaptobenzothiazole, tolyltriazole, benzotriazole and 5-methylbenzotriazole. A compound of the triazine type are present in an amount of from 1.0 to 20.0 wt. %, preferably 1.0 to 5.0 wt. % and include 6,6',6"-(1,3,5-triazine-2,4,6-triyltriimino) tris hexanoic acid. Salts of such compounds include the alkali metal salts, alkaline earth metal salts, amine salts, ammonia salts and transition metal salts.

A particularly preferred corrosion inhibitor system of the present invention to be added to an intermediate heat transfer medium is formulated as a water solution, e.g., 80.2 wt. % $H_2O$, 3.2 wt. % caustic potash (45% solution), 4.1 wt. % tricarboxylic acid available from FMC Corporation under the trademark "Belcor 590", 1.0 wt. % organophosphorus compound (available from FMC Corporation under the trademark "Belcor 575"), 10.0 wt. % morpholine, 0.4 wt. % sodium mercapto benzothiazole (50% solution), 0.1 wt. % of 2,2'-[(2-heptadecyl)-4(5H) - oxazolylidine-bis (methyleneoxy-2, 1-ethanediyloxy)]-bis ethanol and 1.0 wt. % sodium molybdate (35% solution).

The effectiveness of the present invention is set forth in the following specific examples which are intended to be merely illustrative and the present invention is intended not to be limited thereto.

EXAMPLES

Corrosion coupons are suspended in a bath of 25% calcium chloride brine at room temperature including a corrosion inhibitor system (amine vice caustic potash) without and with 2,2'-[(2-heptadecyl)-4(5H) - oxazolylidine-bis (methyleneoxy-2, 1-ethanediyloxy)]-bis ethanol. Rotation of the coupons are effected for 18 days after which the coupons are removed, cleaned and weighed to determine corrosion rates (mils per year as weight loss). The results are set forth in Table I.

TABLE 1

| Treatment | 1010 Mild Steel | Admirably Brass | 90% Copper 10% Nickel | Electrically MS-AB | Connected MS-90:10 |
|---|---|---|---|---|---|
| No CIS* | 8.6 mpy | 14.2 mpy | 0.8 mpy | 10.6 mpy–0.2 mpy | 15.6 mpy |
| CIS w/o Oxazoline (7500 ppm) | 3.2 mpy | 7.6 mpy | 0.6 mpy | 10.1 mpy–0.2 mpy | 10.5 mpy–0.1 mpy |
| CIS with Oxazoline (7500 ppm) | 2.0 mpy | 0.5 mpy | 0.6 mpy | 8.3 mpy–0.1 mpy | 5.7 mpy–0.1 mpy |
| CIS w/o Oxazoline (10,000 ppm) | 4.1 mpy | 2.10 mpy | 0.6 mpy | 7.3 mpy–0.3 mpy | 8.8 mpy–0.1 mpy |
| CIS with Oxazoline (10,000 ppm) | 1.1 mpy | 0.3 mpy | 0.6 mpy | 1.9 mpy–0.2 mpy | 3.1 mpy–0.1 mpy |

*Corrosion Inhibitor System

While the present invention has been described in connection with an exemplary embodiment thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

What is claimed is:

1. A corrosion inhibitor system for an intermediate heat transfer medium, which comprises an oxazoline in admixture with organic corrosion inhibitors and said oxazoline being present in the amount of from about 0.01 to about 5.0 wt. %, and said oxazoline being selected from the group consisting of 2,2'-[(2-heptadecyl)-4 (5H)-oxazolylidine-bis (methyleneoxy-2, 1-ethanediyloxy)]-bis-ethanol, 2,2'-(2-heptadecyl)-4 (5H)-oxazolylidine bis methanol and 2,2'-(2-heptadecyl)-4 (5H)-oxazolylidine ethane methanol.

2. The corrosion inhibitor system as defined in claim 1 wherein said oxazoline is preferably present in an amount of from 0.1 to 1.5 wt. %.

3. The corrosion inhibitor system as defined in claim 1 wherein said oxazoline is 2,2'-[(2-heptadecyl)-4 (5H)-oxazolylidine-bis (methyleneoxy-2, 1-ethanediyloxy)]-bis-ethanol.

4. The corrosion inhibitor system as defined in claim 2 wherein said oxazoline is 2,2'-[(2-heptadecyl)-4 (5H)-oxazolylidine-bis (methyleneoxy-2, 1-ethanediyloxy)]-bis-ethanol.

5. The corrosion inhibitor system as defined in claim 1 and further including a compound selected from the group consisting of an organophosphonic acid and water-soluble salts thereof, a compound selected from the group consisting of an azole and water-soluble salts thereof and a compound selected from the group consisting of a triazine and water-soluble salts thereof.

6. The corrosion inhibitor system as defined in claim 5 wherein said organophosphonic acid and water-soluble salts thereof are present in an amount of from 1.0 to 20 wt. % and said azole and water-soluble salts thereof are present in an amount of from 0.1 to 5.0 wt. % and said triazine and water-soluble salts thereof are present in an amount of from 1.0 to 20.0 wt. %.

7. The corrosion inhibitor system as defined in claim 6 wherein said organophosphonic acid and water-soluble salts thereof are preferably present in an amount of from 1.0 to 5.0 wt. % and said azole and water-soluble salts are preferably present in an amount of from 0.2 to 1.0 wt. % and said triazine and water-soluble salts thereof are present in an amount of from 0.2 to 1.0 wt. %.

8. In a heat transfer system utilizing an intermediate heat transfer medium, the improvement which comprises introducing into said intermediate heat transfer medium a corrosion inhibitor system including an oxazoline constituting of from about 0.01 to 5.0 wt. % thereof, said oxazoline being selected from the group consisting of 2,2'-[(2-heptadecyl)-4 (5H)-oxazolylidine-bis (methyleneoxy-2, 1-ethanediyloxy)]-bis-ethanol, 2,2'-(2-heptadecyl)-4 (5H)-oxazolylidine bis methanol and 2,2'-(2-heptadecyl)-4 (5H)-oxazolylidine ethane methanol.

9. The heat transfer system as defined in claim 8 wherein said oxazoline constitutes of from 0.1 to 1.5 wt. % of said corrosion inhibitor system.

10. The heat transfer system as defined in claim 8 wherein said oxazoline is 2,2'-[(2-heptadecyl)-4 (5H)-oxazolylidine-bis (methyleneoxy-2, 1-ethanediyloxy)]-bis-ethanol.

11. The heat transfer system as defined in claim 8 wherein said intermediate heat transfer medium is used in an induction heating assembly and of from 100 to 5000 ppm of said corrosion inhibitor system is introduced to one part of said intermediate heat transfer medium.

12. The heat transfer system as defined in claim 8 wherein said intermediate heat transfer medium is a salt-based solution and of from 7500 to 10,000 ppm of said corrosion inhibitor system is introduced to one part of said salt-based solution.

* * * * *